United States Patent [19]
Yamaguchi

[11] Patent Number: 5,978,355
[45] Date of Patent: Nov. 2, 1999

[54] SYSTEM AND METHOD FOR CONTROLLING RE-ASSEMBLING BUFFER FOR TRANSMISSION DATA IN A FORM OF DATA CELL

[75] Inventor: Yasuhiro Yamaguchi, Tokyo, Japan

[73] Assignee: NEC Corporation, Tokyo, Japan

[21] Appl. No.: 08/822,349

[22] Filed: Mar. 20, 1997

[30] Foreign Application Priority Data

Mar. 21, 1996 [JP] Japan .................................. 8-063955

[51] Int. Cl.⁶ .................................................. H04J 3/14
[52] U.S. Cl. ........................ 370/230; 370/395; 370/474
[58] Field of Search .................................. 370/398, 395, 370/412, 428, 236, 229, 230, 235, 252, 429, 474, 476; 395/876, 872, 873, 874, 875, 877, 849, 842

[56] References Cited

U.S. PATENT DOCUMENTS

| | | | |
|---|---|---|---|
| 5,227,876 | 7/1993 | Cucchi et al. | 358/133 |
| 5,241,536 | 8/1993 | Grimble et al. | 370/60.1 |
| 5,426,736 | 6/1995 | Guineau, III | 395/250 |
| 5,673,396 | 9/1997 | Smolansky | 395/250 |
| 5,677,906 | 10/1997 | Hayter et al. | 370/17 |
| 5,680,539 | 10/1997 | Jones | 395/182.04 |
| 5,757,771 | 5/1998 | Li et al. | 370/235 |

FOREIGN PATENT DOCUMENTS

| | | |
|---|---|---|
| 57-159192 | 10/1982 | Japan . |
| 4-113744 | 4/1992 | Japan . |
| 4-127746 | 4/1992 | Japan . |
| 4-156025 | 5/1992 | Japan . |
| 5-244186 | 9/1993 | Japan . |

*Primary Examiner*—Ajit Patel
*Assistant Examiner*—Brian D Nguyen
*Attorney, Agent, or Firm*—Sughrue, Mion, Zinn, Macpeak & Seas, PLLC

[57] ABSTRACT

When an ATM cell is re-assembled, in order to accommodate fluctuation of delay of arriving ATM cells, the ATM cells are sequentially written in and read out from a re-assembling queue buffer in a first-in first-out manner. A storage depth of the buffer is automatically adjusted so that a delay of the ATM cells becomes minimum. After initializing a storage depth of the buffer, reading out of the ATM cells from the buffer is initiated when the cells are accumulated up to the intermediate depth of the initialized storage depth. Then, overflow or underflow within the predetermined period is monitored by a training control portion. When the overflow or underflow is detected, the storage depth is increased by a predetermined amount and then the ATM cells are again accumulated and read out with monitoring overflow and underflow. The above mentioned process is repeated until the overflow and underflow are not detected. By this, the storage depth of the buffer can be optimized.

13 Claims, 3 Drawing Sheets

SYSTEM AND METHOD FOR CONTROLLING RE-ASSEMBLING BUFFER FOR TRANSMISSION DATA IN A FORM OF DATA CELL

BACKGROUND OF THE INVENTION

1. Field of the Invention

The present invention relates generally to a system and a method for controlling a re-assembling buffer. More specifically, the invention relates to a system and a method for controlling a re-assembling queue buffer for re-assembling cells in a transmission system, in which CBR (Constant Bit Rate) data is transmitted in a form of a cell.

2. Description of the Related Art

In an ATM (Asynchronous Transfer Mode) communication, there are functions, in which the CBR data to be transmitted is formed into an ATM cell data of a constant bit length, these ATM cells are transmitted to a TDM (Time Division Multiplex) transmission line as a TDM transmission data, and a TDM reception data is received from the TDM transmission line as the ATM cell. Such functions are referred to as CLAD (Cell Assembly and Disassembly) function, which has been defined in ITU-T as one function of an ATM adaptation layer.

In the ATM adaptation layer, there are a re-assembling function (on the basis of the protocol defined in AAL1) for converting the ATM cell into the TDM transmission data, and conversely assembling function (on the basis of the protocol defined in AAL1) for converting TDM data into the ATM cell.

FIG. 3 is a block diagram showing re-assembling/assembling function, the reception ATM cells (Cell) are sequentially received in first-in first-out manner in a re-assembling queue buffer 1 and then input to a re-assembling portion 2 with accommodating delay fluctuation amount of respective cells. Thus, the data is re-assembled to be transmitted to the TDM transmission line as the TDM transmission data.

On the other hand, the TDM reception data received from the TDM transmission line are assembled by an assembling portion 3 into the ATM cells to be transmitted.

In the conventional construction shown in FIG. 3, a storage depth of the re-assembling queue buffer 1 for accommodating delay fluctuation of the ATM cell is typically fixed. The delay fluctuation of the ATM cell to be accommodated by the re-assembling queue buffer 1 depends on parameters of number of nodes through which the cell passes, delay fluctuation amount of respective node, line speed and so forth.

Thus, fluctuation of the cell delay amount depending upon various parameters requires variation of the storage depth of the re-assembling queue buffer 1 to accommodate the delay amount depending upon fluctuation. In the alternative, in case where the storage depth of the re-assembling queue buffer cannot be varied, the storage depth of the buffer has to be set to be large enough to accommodate the possible maximum delay fluctuation amount.

The storage depth of the re-assembling queue buffer 1 is the significant factor for defining data transmission delay. In order to reduce the data transmission delay in system, it is required to make the storage depth of the buffer smaller.

Thus, the storage depth of the re-assembling queue buffer should compromise accommodation of delay fluctuation amount of the reception ATM cell and shortening data transmission delay period.

SUMMARY OF THE INVENTION

It is an object of the present invention to provide a system and a method for controlling a re-assembling buffer of a transmission data in a form of a cell so as to automatically adjust a storage depth of a re-assembling queue buffer and to provide minimum transmission delay by accommodating delay fluctuation of the cell.

According to the first aspect of the invention, a re-assembling buffer control system, in which transmission data in a form of cell is sequentially writing in the cell form transmission data and reading the cell form transmission data for accommodating fluctuation of delay, comprises:

setting control means for performing setting control of a storage depth of the buffer;

reading out control means for performing reading stop control of the buffer and initiating reading out control when cell form transmission data is accumulated up to an intermediate depth of the storage depth;

detecting means for detecting overflow or underflow within a predetermined period in reading out of the buffer; and operation control means for initially setting the storage depth of the buffer, initiating reading out when the cell form transmission data is stored up to the intermediate depth of the storage depth of the buffer, modifying a predetermined amount of the storage depth with stopping of reading out of the buffer, and designating repetition of operation for control by the reading out control means until detection of the detecting means disappears.

In the preferred construction, the re-assembling buffer control system may further comprise a notice signal generating means which generates a notice signal for notifying a training state to an external transmission line during a training period, in which the setting control means and the reading out control means are operated repeatedly for training. The notice signal generating means may include a signal source generating the notice signal, and a selector for selecting the notice signal to transmit to the transmission line during the training period.

The predetermined period may be a period determined corresponding to a reciprocal of a transmission speed of a data transmission line supplied the cell form transmission data. The re-assembling buffer may be a first-in first-out buffer.

According to the second aspect of the invention, a re-assembling buffer control method, in which transmission data in a form of cell is sequentially writing in the cell form transmission data and reading the cell form transmission data for accommodating fluctuation of delay, comprises:

first step of initializing a storage depth of the buffer;

second step of initiating reading out when the cell form transmission data is accumulated up to an intermediate depth of the storage depth;

third step of interrupting reading out of the buffer when overflow or underflow of said buffer is detected during reading out;

fourth step of modifying the storage depth of the buffer by a predetermined amount; and fifth step of repeating the second to fourth steps until overflow or underflow disappears.

The reassembling buffer control method may further comprise a sixth step of notifying the fact being in training during a training period, in which the first to fifth steps are executed, to an external transmission line. The storage depth may set an initial storage depth at zero.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

At first, operation of a system and a method for re-assembling a data in a form of cell, such as an ATM cell, according to the present invention, will be discussed for facilitating understanding of the description given hereinafter. A storage depth of a buffer for re-assembling queue is initialized. At a timing of accumulation of the cells up to the intermediate depth of the initialized storage depth, reading out of the cell from the buffer is started. If overflow or underflow is detected during a given period in the reading out, the storage depth is modified by a predetermined amount (±1) to interrupt reading out until the cells are accumulated up to the intermediate depth.

By repeating the foregoing process until the underflow or overflow is not detected, the optimum depth of the buffer can be set. During setting of the optimum depth of the buffer, i.e. during training period, notice indicative of being in training period is fed to associated TDM (Time Division Multiplexer) nodes or CODEC via an external transmission line.

The preferred embodiment of the system and the method according to the present invention will be discussed hereinafter with reference to the drawings, particularly to FIGS. 1 and 2.

Figure 1:
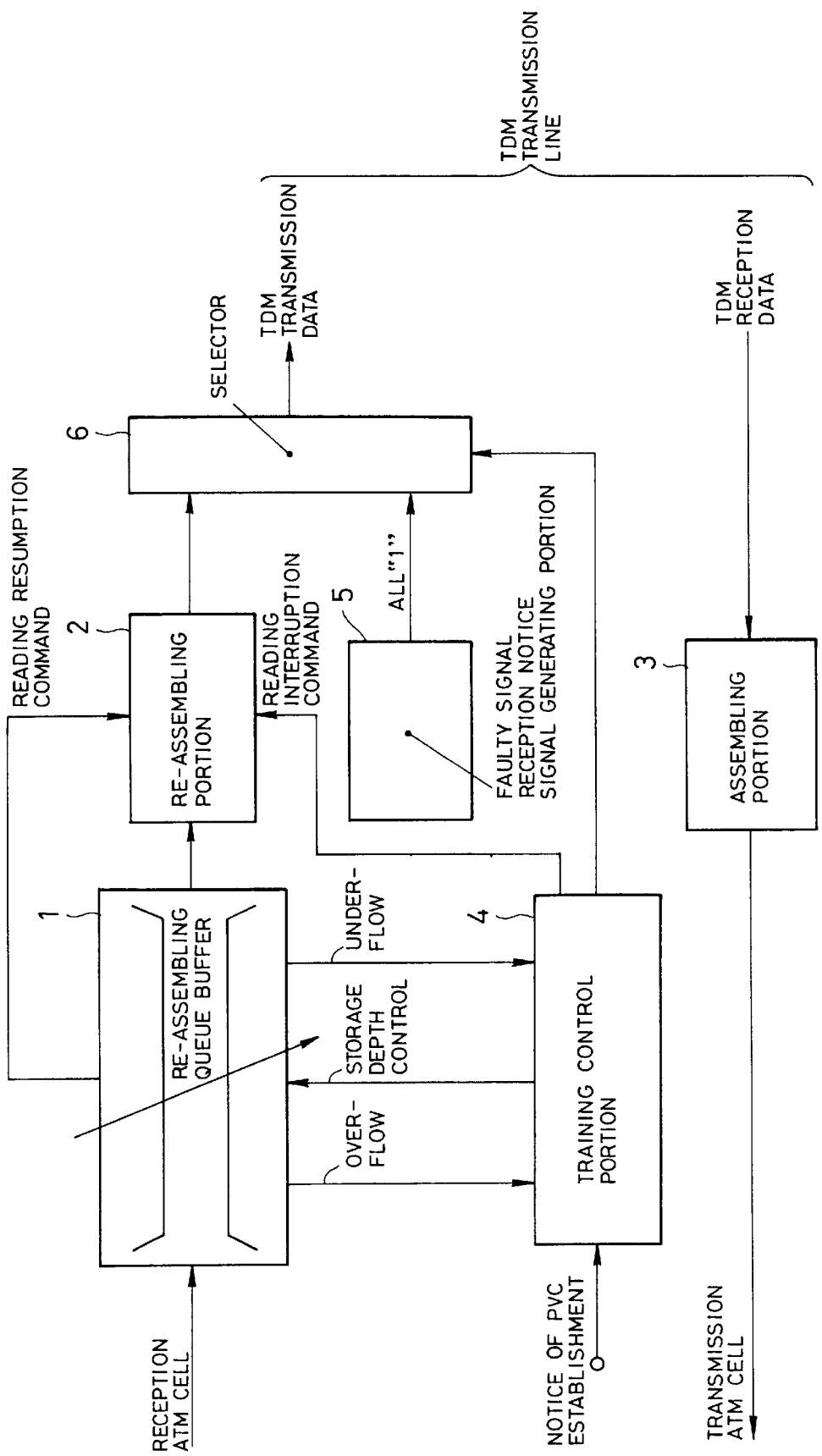
FIG. 1 is a block diagram showing the preferred embodiment of a control system for controlling re-assembling an ATM cell according to the present invention.

FIG. 1 is a block diagram showing the preferred embodiment of the system for re-assembling a data in a form of CBR cell, such as ATM cell according to the present invention. The CBR cells are stored in a re-assembling queue buffer (hereinafter referred to as "buffer") 1, which can be controlled to vary a storage depth, in first-in first-out manner. Through the re-assembling queue buffer, a fluctuation of delay is accommodated and read out to be fed to a re-assembling portion 2.

In the re-assembling portion 2, the ATM cells are converted into TDM data. process is performed according to a protocol based on a provision of AAL1. The converted TDM data is then transmitted through the TDM transmission line.

The TDM reception data from the TDM transmission line is input to an assembling portion 3. Then, the TDM reception data is processed according to the protocol based on the provision of AAL1 to form the ATM cell.

A training control portion 4 performs control of the storage buffer 1. In conjunction therewith, the training control portion 4 commands for reading interrupt control of the buffer to the re-assembling portion 2.

The buffer 1 is provided a function for detecting overflow and underflow. In response to detection output of the overflow and underflow detection, the training control portion 4 performs a storage depth control and a reading out interruption control.

On the other hand, the training control portion 4 switches a selector 6 in training adjustment of the storage depth of the buffer 1, for transmitting a notice signal of a faulty signal reception notice signal generating portion 5 (set all "1") to the TDM transmission line.

Figure 2:
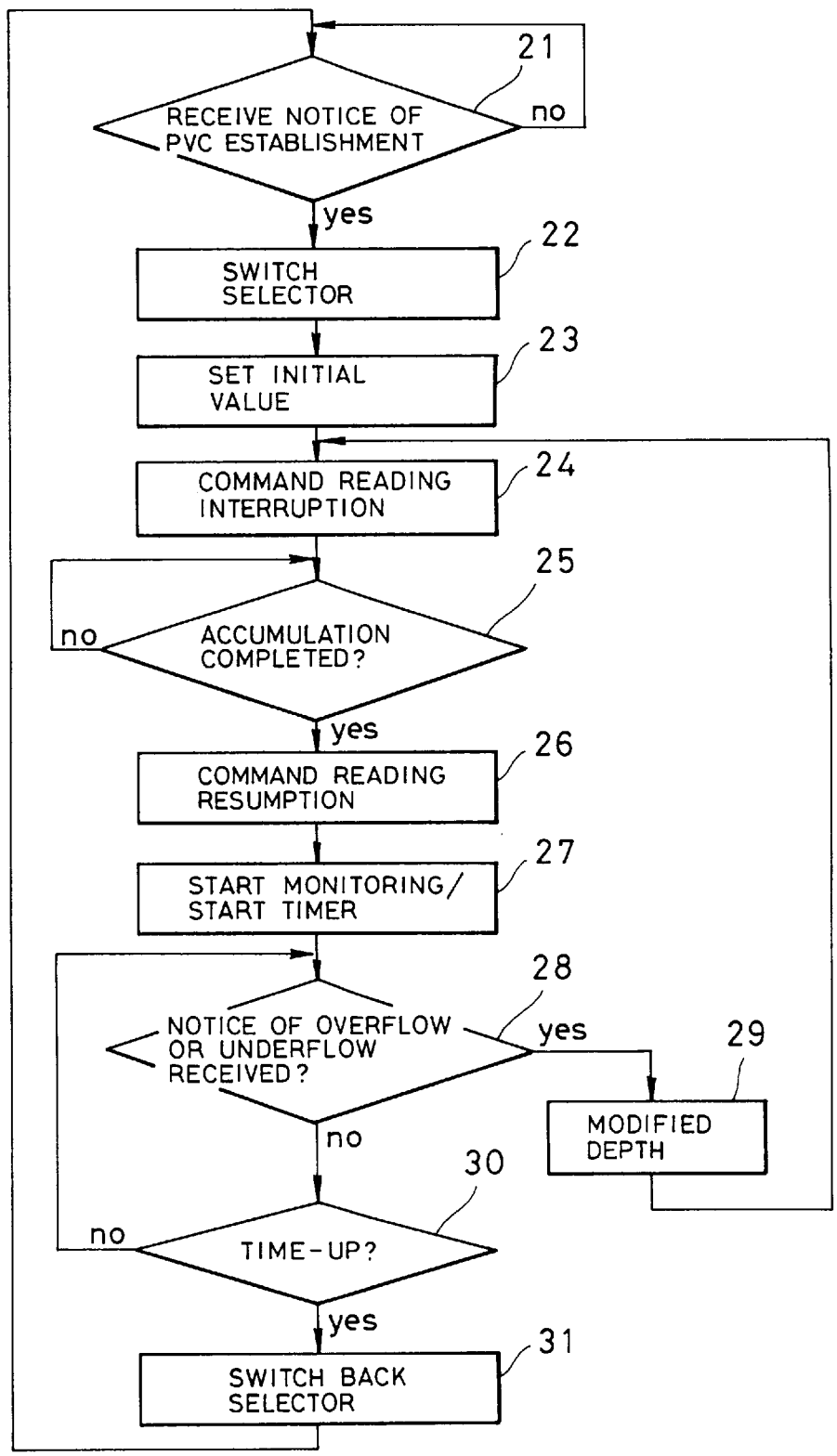
FIG. 2 is a flowchart showing operation of the preferred embodiment of the control system of FIG. 1.
Figure 3:
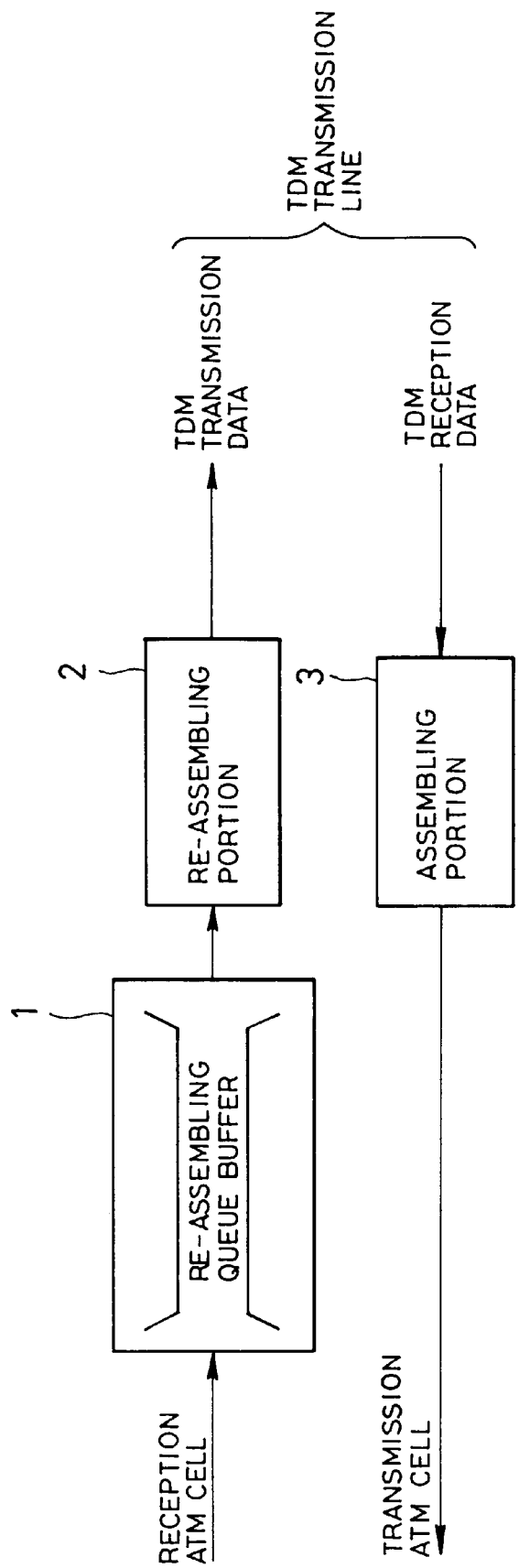
FIG. 3 is a block diagram for explaining one function of the conventional ATM adaptation layer.

FIG. 2 is a flowchart showing control operation of the training control portion 4. When establishment of a PVC (Permanent Virtual Channel: fixed connection service, in which call establishing and releasing is performed by a service order as a fixed path for the user) transmitting the CBR data, is performed, a signal notifying establishment of PVC is input (step 21)

In response to the notice of establishment of the PVC, the training control portion 4 switches the selector 6 (step 22) for outputting all "1"as output of the faulty signal reception notice signal generating portion 5, to the transmission line to notice being in training period to the associated TDM nodes or CODEC.

Next, in the condition where the storage depth of the buffer 1 is set at the initial value (step 23), and reading out of the buffer 1 is stopped (step 24), accumulation of the reception ATM cells is initiated. When the cells are stored in the intermediate depth of the storage depth by accumulation of the reception ATM cells, reading resumption command is output from the buffer 1 (step 26).

It should be noted that while the reading resumption command is generated by the buffer 1, it may be possible to generate the reading resumption command by the training control portion 4 by detecting accumulation of the reception ATM cells up to the intermediate depth of the storage depth by the training control portion 4.

In response to reading resumption command, a monitoring timer is started (step 27). At the same time, the re-assembling portion 2 performed re-assembling by sequentially reading out the cells in first-in first-out manner from the buffer 1. Even during reading out, storing of the reception ATM cells continues.

When overflow or underflow is caused in the buffer 1 during operation, the fact is noticed by the training control portion 4 (step 28). In response to this notice, the storage depth of the buffer 1 is modified by a predetermined amount in the training control portion 4 (step 29). In conjunction therewith, a reading interruption command is issued to start accumulation of the reception ATM cells in the buffer 1.

When the reception ATM cells are accumulated up to the intermediate depth of the storage depth of the buffer 1 (step 25), reading out is again initiated and at the same time, the monitoring timer is started. Then, the foregoing operation is repeated.

When neither overflow nor underflow is caused during a predetermined period (step 30), the current storage depth is regarded as optimum. Then, the selector 6 is switched back. The TDM transmission data as the output of the re-assembling portion 2 is transmitted to the TDM transmission line. Then, the data transmission mode becomes normal data transmission mode, and then the training is terminated.

As the initial value of the storage depth of the buffer 1 (at step 23), a quite small value is selected. For instance, the depth is initially set "0", with setting the accumulation amount of the cell in the buffer 1 being half of the depth, the foregoing control operation is initiated.

Then, underflow is instantly caused. This results in initiation of the depth adjustment (steps 28 and 29). Assuming the adjustment amount in this case is "+1", the depth becomes "1", at first. Even with this value, if the delay fluctuation amount is greater than or equal to "1", underflow is again caused. Then, the depth is again modified by "+1".

This operation is repeated sequentially up to the depth where fluctuation of delay can be accommodated. At this time, the final depth can be considered as the minimum depth required for accommodating fluctuation of the delay. Then, by setting the accumulation amount of the cells in the buffer (step 25) is set to be "half of the depth", a period corresponding to "half of the depth" becomes inherently required as the delay period for the buffer 1 to cause a delay.

A monitoring period of the monitoring timer at step 30 is set at a period proportional to a reciprocal of a transmission line speed.

An example of an adjustment method of the storage depth of the buffer 4 will be discussed in the simplified form. It is assumed that 100-byte memory can be used as the buffer 1, dividing this 100-byte buffer into 2-byte unit, 50 divisions are established. Upon establishing queue of 2-byte depth, one of 50 divisions is set at first stage, and an address showing any one of remaining 49 divisions is stored in the second byte. The portion designated by the address stored in the second byte of the first stage becomes the second stage. The second byte of the second stage stores NULL indicative of the end of the queue. Thus, a queue having a 2-byte depth can be established.

In order to increase the depth of the queue, an address showing any one of remaining 48 divisions is stored in the second byte of the second stage, and NULL is set in the second byte of the third stage. The portion designated by the address stored in the second byte of the second stage is the third stage. Thus, the depth can be increased up to 50 bytes. Opposite operation may be performed in order to reduce the depth.

As set forth above, according to the present invention, since the depth of the re-assembling queue is automatically adjusted every time of occurrence of establishment of the line to make the delay minimum. Therefore, optimal depth of the re-assembling queue can be set without performing any negotiation between associated ATM nodes.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A re-assembling buffer control system for accommodating fluctuation of delay, in which cell form transmission data is sequentially written in and read out from a re-assembling buffer, comprising:

setting control means for performing setting control of a storage depth of the re-assembling buffer;

reading out control means for performing reading stop control of said re-assembling buffer and initiating reading out control when cell form transmission data is accumulated up to an intermediate depth of the storage depth;

detecting means for detecting overflow or underflow within a predetermined period in reading out of said re-assembling buffer; and operation control means for initially setting the storage depth of said re-assembling buffer, initiating reading out when the cell form transmission data is stored up to the intermediate depth of the storage depth of said re-assembling buffer, modifying a predetermined amount of said storage depth with stopping of reading out of said re-assembling buffer, and designating repetition of operation for control by said reading out control means until detection of said detecting means disappears.

2. A reassembling buffer control system as set forth in claim 1, which further comprises a notice signal generating means which generates a notice signal for notifying a training state to an external transmission line during a training period, in which said setting control means and said reading out control means are operated repeatedly for training.

3. A re-assembling buffer control system as set forth in claim 2, wherein said notice signal generating means includes a signal source generating said notice signal, and a selector for selecting said notice signal to transmit to said transmission line during said training period.

4. A re-assembling buffer control system as set forth in claim 1, wherein said predetermined period is a period determined corresponding to a reciprocal of a transmission speed of a data transmission line supplied said cell form transmission data.

5. A re-assembling buffer control system as set forth in claim 1, wherein said re-assembling buffer is a first-in first-out re-assembling buffer.

6. A re-assembling buffer control method for accommodating fluctuation of delay, in which cell form transmission data is sequentially written in and read out from a re-assembling buffer comprising:

first step of initializing a storage depth of said re-assembling buffer;

second step of initiating reading out when said cell form transmission data is accumulated up to an intermediate depth of said storage depth;

third step of interrupting reading out of said re-assembling buffer when overflow or underflow of said re-assembling buffer is detected during reading out;

fourth step of modifying said storage depth of said re-assembling buffer by a predetermined amount; and fifth step of repeating said second to fourth steps until overflow or underflow disappears.

7. A re-assembling buffer control method as set forth in claim 6, which further comprises a sixth step of notifying the fact being in training during a training period, in which said first to fifth steps are executed, to an external transmission line.

8. A re-assembling buffer control method as set forth in claim 6, wherein storage depth is set an initial storage depth at zero.

9. A re-assembling buffer control system for accommodating fluctuation of delay, in which cell form transmission data is sequentially written in and read out from a re-assembling buffer, comprising:

a setting device for performing setting control of a storage depth of the re-assembling buffer;

a read-out device for performing reading stop control of said re-assembling buffer and initiating reading out control when cell form transmission data is accumulated up to an intermediate depth of the storage depth;

a detector for detecting overflow or underflow within a predetermined period in reading out of said re-assembling buffer; and an operation control device for initially setting the storage depth of said re-assembling buffer, initiating reading out when the cell form transmission data is stored up to the intermediate depth of the storage depth of said re-assembling buffer, modifying a predetermined amount of said storage depth with stopping of reading out of said re-assembling buffer, and designating repetition of operation for control by said read-out control device until detection of said overflow or underflow disappears.

10. A re-assembling buffer control system as set forth in claim 9, which further comprises a notice signal generator which generates a notice signal for notifying a training state to an external transmission line during a training period, in which said setting device and said read-out device are operated repeatedly for training.

11. A re-assembling buffer control system as set forth in claim 10, wherein said notice signal generator includes a signal source generating said notice signal, and a selector for selecting said notice signal to transmit to said transmission line during said training period.

12. A re-assembling buffer control system as set forth in claim 9, wherein said predetermined period is a period determined corresponding to a reciprocal of a transmission speed of a data transmission line supplied said cell form transmission data.

13. A re-assembling buffer control system as set forth in claim 9, wherein said re-assembling buffer is a first-in first-out re-assembling buffer.

\* \* \* \* \*